(12) United States Patent
Landeck et al.

(10) Patent No.: US 11,333,114 B2
(45) Date of Patent: May 17, 2022

(54) INLET STRUCTURE OF A RESERVOIR POT

(71) Applicant: Bayerische Motoren Werke Aktiengesellschaft, Munich (DE)

(72) Inventors: Bastian Landeck, Unterhaching (DE); Christoph Laumer, Woerth/Donau (DE); Raul Ramos Alonso, Schechen (DE); Benjamin Schimpf, Winkelhaid (DE); Christian Treml, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/264,823

(22) PCT Filed: Jul. 10, 2019

(86) PCT No.: PCT/EP2019/068522
§ 371 (c)(1),
(2) Date: Jan. 31, 2021

(87) PCT Pub. No.: WO2020/025272
PCT Pub. Date: Feb. 6, 2020

(65) Prior Publication Data
US 2021/0293211 A1 Sep. 23, 2021

(30) Foreign Application Priority Data
Aug. 1, 2018 (DE) ...................... 10 2018 212 831.6

(51) Int. Cl.
*F01D 1/06* (2006.01)
*F02M 37/00* (2006.01)
(Continued)

(52) U.S. Cl.
CPC ....... *F02M 37/0011* (2013.01); *B60K 15/077* (2013.01); *F02M 37/0082* (2013.01);
(Continued)

(58) Field of Classification Search
CPC .... F02M 37/10; F02M 37/106; F02M 37/103; F01D 1/06; F04D 19/022
(Continued)

(56) References Cited

U.S. PATENT DOCUMENTS 4,747,388 A    5/1988   Tuckey
5,647,329 A *   7/1997   Bucci ................. B01D 35/0273
                                                  123/509

(Continued)

FOREIGN PATENT DOCUMENTS

CN    102937060 A    2/2013
CN    103573493 A    2/2014
(Continued)

OTHER PUBLICATIONS

International Search Report (PCT/ISA/210) issued in PCT Application No. PCT/EP2019/068522 dated Nov. 7, 2019 with English translation (three (3) pages).

(Continued)

*Primary Examiner* — John Kwon
(74) *Attorney, Agent, or Firm* — Crowell & Moring LLP (57) ABSTRACT

The invention relates to an inlet structure of a reservoir pot, comprising a base plate, which can be arranged in an operating medium tank with the formation of a receiving volume below the base plate, and a plurality of first elements which extend from the base plate, wherein the first elements are at least partially spaced apart from one another, and operating medium can flow between the first elements into the receiving volume and can flow out of the receiving volume, wherein the first elements present a greater flow resistance in the outflow direction than in the inflow direction.

17 Claims, 9 Drawing Sheets

(51) Int. Cl.
*B60K 15/077* (2006.01)
*B60K 15/03* (2006.01)

(52) U.S. Cl.
CPC ............. *B60K 2015/03105* (2013.01); *B60K 2015/0777* (2013.01)

(58) Field of Classification Search
USPC ........ 123/509, 510, 514, 463; 137/576, 572, 137/574, 565; 415/83, 84, 151, 159
See application file for complete search history.

(56) References Cited

U.S. PATENT DOCUMENTS

| | | | |
|---|---|---|---|
| 5,699,773 | A | 12/1997 | Kleppner et al. |
| 7,390,163 | B2 * | 6/2008 | Clauson .................... F01D 1/22 |
| | | | 415/199.2 |
| 2002/0149876 | A1 * | 10/2002 | Sakata ................. G11B 33/148 |
| | | | 360/97.13 |
| 2007/0215121 | A1 | 9/2007 | Attwood et al. |
| 2014/0042079 | A1 | 2/2014 | Hibi et al. |
| 2015/0147163 | A1 * | 5/2015 | DeRuyter ............. F03D 3/0436 |
| | | | 415/151 |
| 2015/0159502 | A1 * | 6/2015 | Laubender ............ F01D 17/165 |
| | | | 415/159 |
| 2015/0377106 | A1 | 12/2015 | Brueck et al. |
| 2016/0185213 | A1 | 6/2016 | Tedman et al. |
| 2017/0211650 | A1 * | 7/2017 | Sakamoto ............. F16F 9/3257 |

FOREIGN PATENT DOCUMENTS

| | | |
|---|---|---|
| CN | 105121800 A | 12/2015 |
| CN | 205417154 U | 8/2016 |
| CN | 107178447 A | 9/2017 |
| DE | 195 21 509 A1 | 12/1996 |
| DE | 198 34 653 C1 | 12/1999 |
| DE | 100 41 678 A1 | 7/2002 |
| DE | 10 2013 010 872 A1 | 12/2014 |
| EP | 0 266 482 A2 | 5/1988 |
| GB | 2340096 A | 2/2000 |
| JP | 10-67237 A | 3/1998 |
| JP | 2013-36405 A | 2/2013 |
| WO | WO 96/41727 | 12/1996 |
| WO | WO 2011/147703 A1 | 12/2011 |
| WO | WO 2013/087692 A1 | 6/2013 |

OTHER PUBLICATIONS

German-language Written Opinion (PCT/ISA/237) issued in PCT Application No. PCT Application No. PCT/EP2019/068522 dated Nov. 7, 2019 (six (6) pages).

German-language Search Report issued in German Application No. 10 2018 212 831.6 dated Jul. 15, 2019 with partial English translation (13 pages).

Chinese-language Office Action issued in Chinese Application No. 201980049340.4 dated Dec. 28, 2021 with English translation (16 pages).

* cited by examiner

INLET STRUCTURE OF A RESERVOIR POT

BACKGROUND AND SUMMARY OF THE INVENTION

The technology disclosed here relates to an inlet structure of a reservoir pot. The reservoir pot is particularly used in an operating medium tank. The operating medium tank is preferably situated in a vehicle and serves for receiving an operating medium, for example fuel.

Various reservoir pots which are also referred to as wash pots or pacification pots are known from the prior art. Such reservoir pots are usually situated in an operating medium tank. The operating medium can flow into the reservoir pot by way of the base of the reservoir pot. A pump for conveying the operating medium from the operating medium tank is usually situated in the reservoir pot. The inlet structure on the base of the reservoir pot herein influences the size of the required pump. A larger pump may require more electric power. Furthermore, a larger pump may require more installation space in a reservoir pot which is critical in terms of installation space. Moreover, the heat output may increase, on account of which the evaporation of operating medium may increase.

It is a preferred object of the technology disclosed here to minimize or eliminate at least one disadvantage of a previously known solution, or to propose an alternative solution. It is in particular a preferred object of the technology disclosed here to enable the use of ideally small operating medium pumps, or to convey operating medium from the operating medium tank into the reservoir pot in an ideally energy-efficient manner. Further preferred objects can be derived from the advantageous effects of the technology disclosed here. The object/objects is/are achieved by the subject matter of the independent claims. The dependent claims represent preferred design embodiments.

The technology disclosed here relates in particular to an inlet structure of a reservoir pot. This inlet structure comprises a base plate and a plurality of elements which extend from the base plate upward or downward. The description "upward or downward" herein refers to the installed position of the reservoir pot in the operating medium tank. The base plate can simultaneously form the base of the reservoir pot and thus close the reservoir pot toward the bottom, wherein the elements extend downward. Furthermore, the base plate can be spaced apart from the base of the reservoir pot, wherein the elements extend from the base plate upward toward the base of the reservoir pot.

It is furthermore possible that the base plate is a component part of an adapter plate that is inserted into the operating medium tank. In this instance, the reservoir pot herein is able to be placed onto the adapter plate; the elements herein can extend from the adapter plate downward or upward. If the elements extend upward, the reservoir pot preferably sits on top of the elements.

The base plate of the inlet structure, while configuring a receptacle volume, is configured to be disposed in an operating medium tank. This receptacle volume herein is formed below or above the base plate and thus in particular between the base plate and the wall (in particular the base) of the operating medium tank, or between the base plate and the base of the reservoir pot. The operating medium tank serves in particular for receiving a liquid operating medium, for example fuel, cooling liquid, water, or lubricant.

The inlet structure preferably comprises at least one opening in the base of the reservoir pot and optionally also in the base of the base plate. The opening serves for guiding the operating medium from the receptacle volume into the reservoir pot lying thereabove. For example, a plurality of openings can also be provided herein, a Venturi nozzle being disposed between the openings so as to actively convey the operating medium from the receptacle volume into the reservoir pot. Furthermore, a valve can be disposed in the opening so as to enable a flow only in one direction, specifically from the receptacle volume to the reservoir pot.

The inlet structure comprises in particular a multiplicity of first elements which extend from the base plate. In the installed state of the reservoir pot, the first elements extend from the base plate downward or upward into the receptacle volume. The first elements are at least in part mutually spaced apart. All first elements are particularly preferably mutually spaced apart. On account of the spacing, operating medium can flow between the first elements into the receptacle volume, or within the receptacle volume, and out of the receptacle volume, respectively. On account of the spacing, the first elements also fulfill the function of rock stoppers. Rock stoppers are primarily not provided for influencing the flow but are intended to keep away relatively large particles.

It is in particular provided that the first elements in the outflow direction represent a higher flow resistance than in the inflow direction. The liquid operating medium is directed about the respective first elements both when flowing in as well as flowing out. On account of the geometric design embodiment of the first elements it is achieved herein that the operating medium in the outflow direction, thus when the operating medium flows from the receptacle volume outward into the operating medium tank, is imparted a higher flow resistance than in the opposite direction. When flowing in the inflow direction, the operating medium flows from the operating medium tank into the receptacle volume.

On account of this difference in the flow resistance in terms of the outflow direction and the inflow direction, the pressure in the receptacle space is increased in comparison to the pressure in the operating medium tank. This increase in the pressure facilitates the operating medium being conveyed through the opening into the reservoir pot.

The reservoir pot is preferably disposed on the base of the operating medium tank and extends in the direction of the vehicle vertical axis. The reservoir pot serves for holding ready a specific volume of operating medium which by way of a pump disposed in the operating medium tank, preferably in the reservoir pot, is conveyed to potential operating medium consumers. It is likewise possible that the pump for suctioning the liquid operating medium is disposed outside the operating medium tank. The volume of the reservoir pot is preferably very small in comparison to the volume of the operating medium tank. In particular, the volume of the reservoir pot can be smaller than the volume of the operating medium tank by at least a factor of 10 preferably by at least a factor of 50, and particularly preferably by at least a factor of 100. The "storage volumes" which can be utilized for receiving the operating medium are at all times relevant here. The opening of the inlet structure extends into the reservoir pot. An element of the pump can preferably be provided so as to be directly neighboring the opening. This can be the pump per se, for example, or a suction point that is fluidically connected to the pump.

The base plate of the inlet structure can be configured so as to be integral to the reservoir pot, for example by way of injection-molding or blow-molding. In another design embodiment, the base plate can be attached to the lower side of the reservoir pot in a form-fitting, materially integral, and/or force-fitting manner. For example, the base plate can be connectable to the reservoir pot by way of latching hooks.

The base plate herein can be a component part of an adapter plate which is fastened in the operating medium tank, for example. The reservoir pot in this instance is correspondingly able to be fastened on this adapter plate.

It is furthermore possible that the entire inlet structure is made so as to be integral to the operating medium tank.

The opening in the base plate for guiding the operating medium from the receptacle volume into the reservoir pot can be disposed so as to be centric in the inlet structure. Alternatively, the opening can also be eccentrically disposed.

It is preferably provided that the first elements are in each case configured so as to taper in the outflow direction. The first elements thus widen along the inflow direction.

It is furthermore preferably provided that the first elements have in each case one pocket. The pocket opens counter to the outflow direction. The outflowing fluid thus flows into these pockets.

It is furthermore preferably provided that the first elements on the side thereof that points outward, thus on the side which in the case of an inflow has an incident flow, are designed so as to be acute, convex, or trapezoidal. On account thereof, the first elements represent an ideally minor flow resistance in the inflow direction.

It is furthermore preferably provided that the inlet structure comprises a multiplicity of second elements. The second elements likewise extend from the base plate. The second elements are preferably situated between two neighboring first elements. It is particularly preferably provided that exactly one second element is in each case disposed between two neighboring first elements. The second elements are disposed so as to reduce the flow cross section between the two neighboring first elements.

The second elements are in particular mutually spaced apart and spaced apart from the first elements. On account of the spacing, the second elements also fulfill the function of rock stoppers.

A radial direction is preferably defined so as to be parallel to the inflow direction and the outflow direction. A circumferential direction extends so as to be perpendicular to this radial direction. The first and the second elements are preferably disposed so as to neighbor one another along the circumferential direction. The first and the second elements particularly alternate along the circumferential direction.

The first and the second elements are preferably shaped and disposed such that the flow cross section resulting between the first and the second elements is configured so as to taper in the inflow direction. The flow cross section between the first and the second elements thus decreases along the inflow direction.

It is in particular provided that the second elements are configured so as to taper in the inflow direction. To this end, it is particularly preferably provided that the second elements are configured so as to be drop-shaped, wherein the tip of the drop shape is oriented in the inflow direction. This means that the outflowing fluid impacts the tip of the drop shape. The inflowing fluid impacts the convex side of the drop shape that is opposite the tip. On account thereof, an ideally minor flow resistance in the inflow is achieved.

It is furthermore preferably provided that the second elements have in each case one pocket. The pocket opens counter to the outflow direction. The outflowing fluid thus flows into these pockets. To this end, the drop-shaped second elements are in particular configured so as to be hollow and open at the tip thereof.

A variable G is in each case defined on the first elements and/or the second elements. The variable G is measured parallel to the base plate and at the largest point of the respective element.

The inlet structure furthermore has a diameter D. The latter is defined as the spacing between two first elements which are the most remote from one another.

The following is in particular provided for the variable G of the first elements and/or second elements: The variable G is at most $0.2*D$, preferably at most $0.1*D$, particularly preferably at most $0.05*D$.

According to one variant it is preferably provided that the first elements and/or the second elements are situated exclusively in a distal region of the inlet structure. The distal region is preferably situated at least $0.3*D$, furthermore preferably at least $0.4*D$, particularly preferably at least $0.45*D$, away from the geometric center of the inlet structure.

On account of the disposal of the first elements and/or second elements exclusively in the distal region, an ideally large receptacle volume which is not reduced by any first elements or second elements, respectively, in the proximal region is achieved.

In one alternative design embodiment it is preferably provided that the first elements and/or second elements are situated not only in the distal region but also in the proximal region. To this end, it is in particular provided that the first elements and/or second elements are distributed across at least 50 percent, preferably at least 60 percent, particularly preferably at least 70 percent, of the face of the inlet structure.

The first elements and/or second elements are preferably configured so as to be relatively small such that a multiplicity of these elements can be used in the inlet structure. It is in particular provided that the inlet structure comprises at least 10, preferably at least 40, particularly preferably at least 60, of the first elements. Additionally or alternatively it is preferably provided that the inlet structure comprises at least 10, preferably at least 40, particularly preferably at least 60, of the second elements.

It is furthermore preferably provided that the inlet structure has a multiplicity of third elements which likewise extend from the base plate into the receptacle volume. The third elements are disposed and configured such that the third elements direct outflowing operating medium into the pockets of the first elements.

The technology disclosed here furthermore comprises a reservoir pot having the described inlet structure.

The technology disclosed here furthermore comprises the described operating medium tank, a reservoir pot disposed in the operating medium tank, and the described inlet structure.

Moreover, the technology disclosed here also comprises a vehicle having the described operating medium tank, a reservoir pot disposed in the operating medium tank, as well as the inlet structure described here.

Further details, features, and advantages of the invention are derived from the description hereunder and the figures.

DETAILED DESCRIPTION OF THE DRAWINGS

Figure 1:
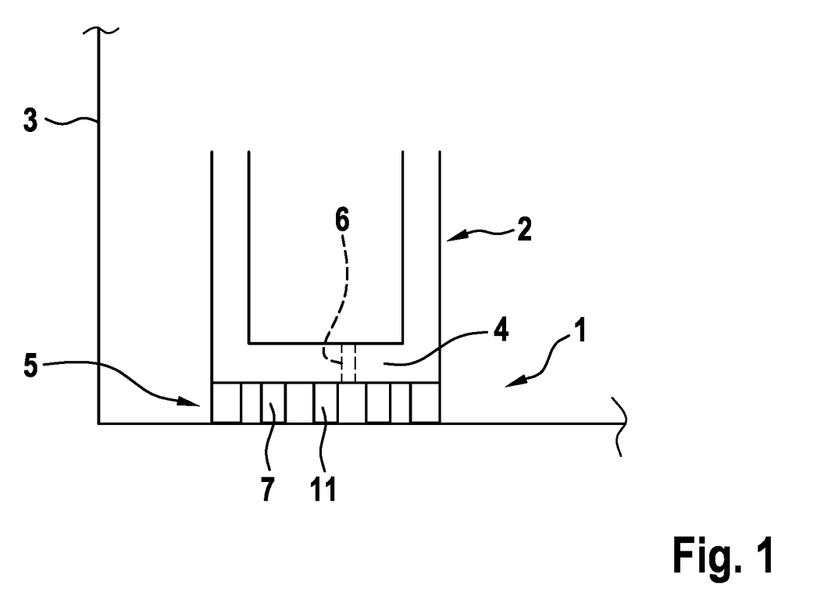
FIG. 1 shows an inlet structure disclosed here on a reservoir pot in a first disposal in an operating medium tank.

FIG. 1 in a purely schematic manner shows an inlet structure 1 on a reservoir pot 2. The reservoir pot 2 is situated in an operating medium tank 3.

The inlet structure 1 comprises a base plate 4. In the variant as per FIG. 1, the base plate 4 of the inlet structure 1 simultaneously forms the reservoir pot base of the reservoir pot 2.

The inlet structure 1 furthermore comprises first elements 7 and second elements 11. The first elements 7 and second elements 11 extend from the base plate 4 downward and preferably bear on the tank base of the operating medium tank 3. On account of the spacing of the base plate 4 from the operating medium tank 3, a receptacle volume 5 is configured between the base plate 4 and the operating medium tank 3.

An opening 6 through which the operating medium is able to be guided from the receptacle volume 5 into the interior of the reservoir pot 2 is situated in the base plate 4.

Figure 2:
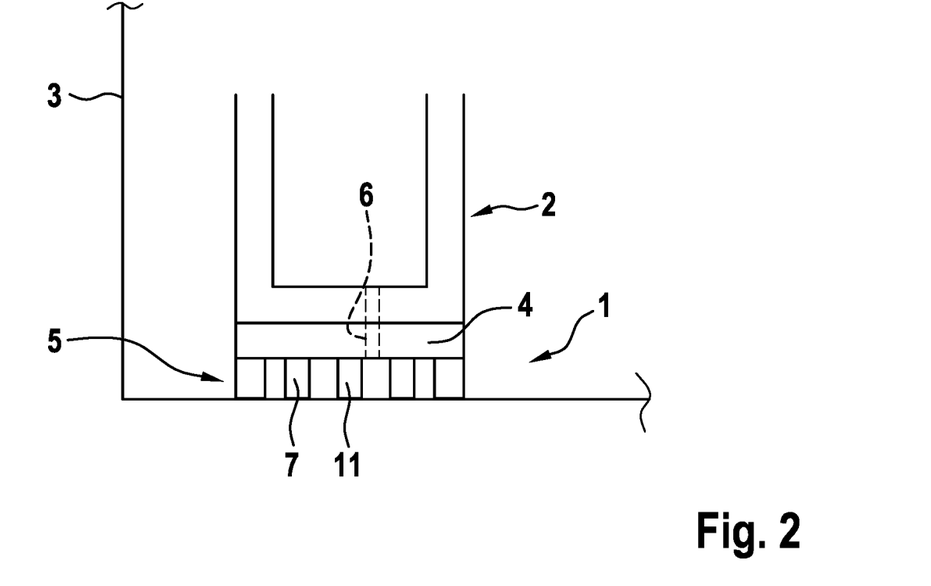
FIG. 2 shows the inlet structure disclosed here on a reservoir pot in a second disposal in an operating medium tank.

FIG. 2 shows a variant in which the reservoir pot 2 comprises a dedicated reservoir pot base which bears on the base plate 4 of the inlet structure 1. Accordingly, the opening 6 extends through the base plate 4 of the inlet structure 1 and through the reservoir pot base of the reservoir pot 2. The base plate 4 of the inlet structure 1 here can represent an adapter plate on which the reservoir pot 2 is able to be fastened, for example.

Figure 2A:
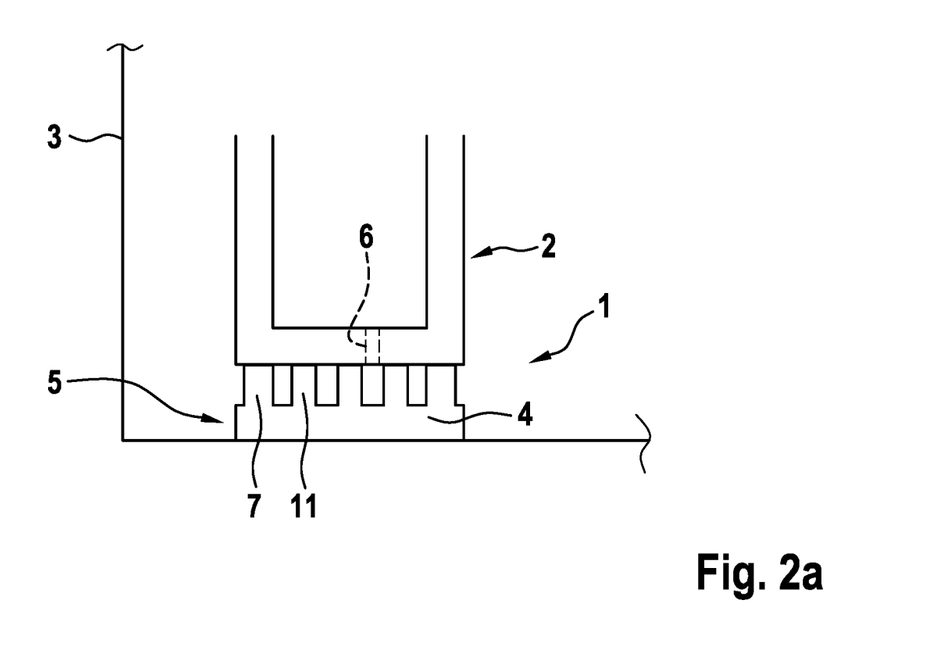
FIG. 2a shows the inlet structure disclosed here on a reservoir pot in a second disposal in an operating medium tank.

FIG. 2a shows a variant having a base plate 4 from which the elements 7, 11 extend upward in the direction of the reservoir pot 2. Accordingly, the receptacle space 5 here is formed between the base of the reservoir pot 2 and the base plate 4.

Figure 3:
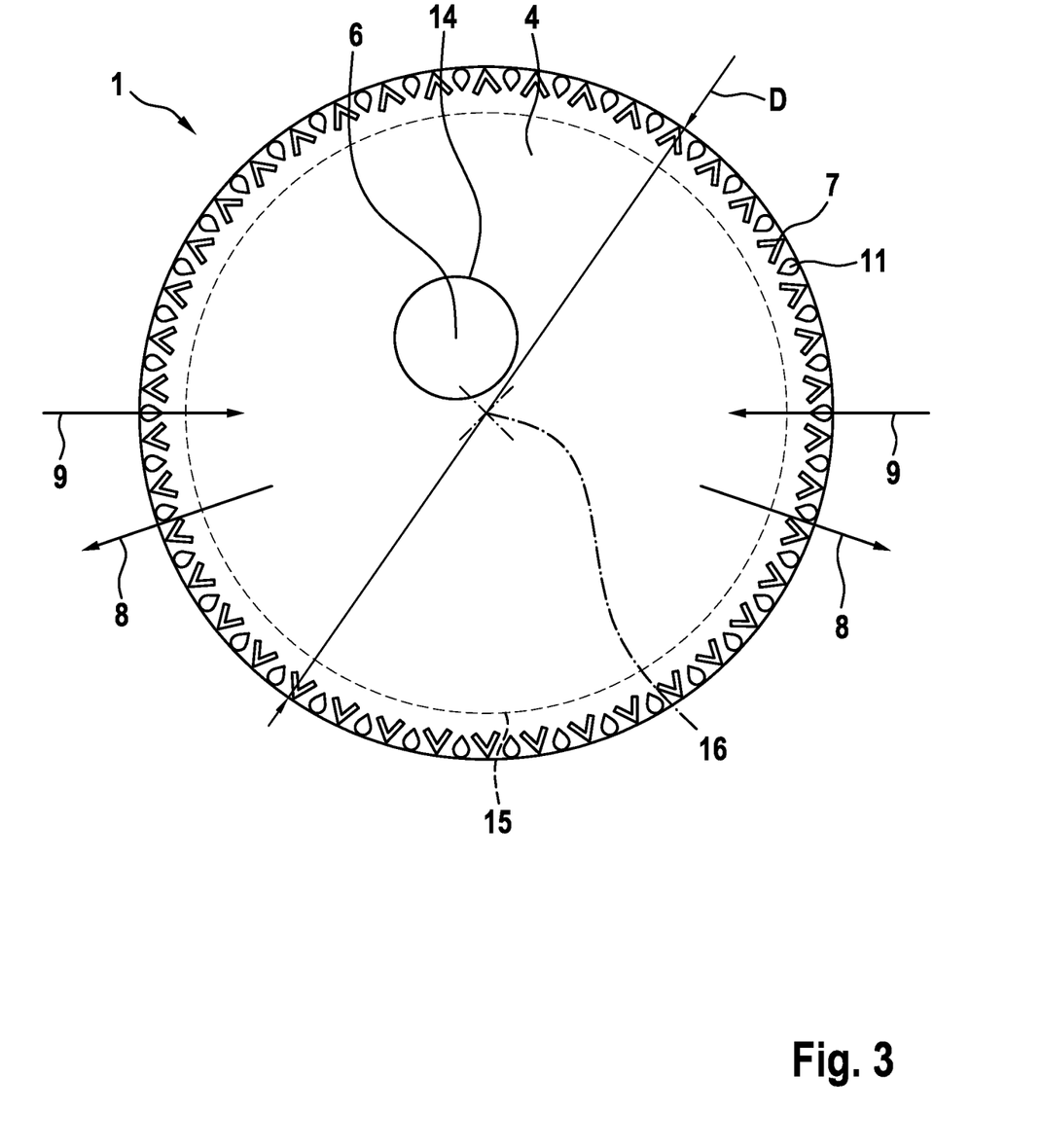
FIG. 3 shows a view from below of the inlet structure disclosed here.

FIG. 3 shows a design embodiment of the inlet structure 1 in an illustration from below. The base plate 4 having the opening 6 can be seen here. A multiplicity of the first elements 7 and a multiplicity of the second elements 11 extend from the base plate 4. The first elements 7 and the second elements 11 here are disposed exclusively in a distal region 15 of the inlet structure 1. This distal region 15 is defined in particular in terms of the geometric center 16 of the inlet structure 1 and is at least 0.3*D away from the center 16, for example.

D describes the diameter of the inlet structure that is measured in a plane parallel to the base plate 4. When the inlet structure 1, as opposed to the illustration in FIG. 3, is not round but has any other shape, the diameter D is preferably defined by two first elements 7 which are the most remote from one another.

FIG. 3 shows an alternating disposal of the first elements 7 and the second elements 11 along the circumference. Exactly one second element 11 herein is in each case situated between two neighboring first elements 7.

FIG. 3 furthermore shows an outflow direction 8 and an inflow direction 9. The operating medium from the operating medium tank 3 flows along the inflow direction 9 into the receptacle volume 5. The operating medium from the receptacle volume 5 flows outward along the outflow direction 8.

Figure 4:
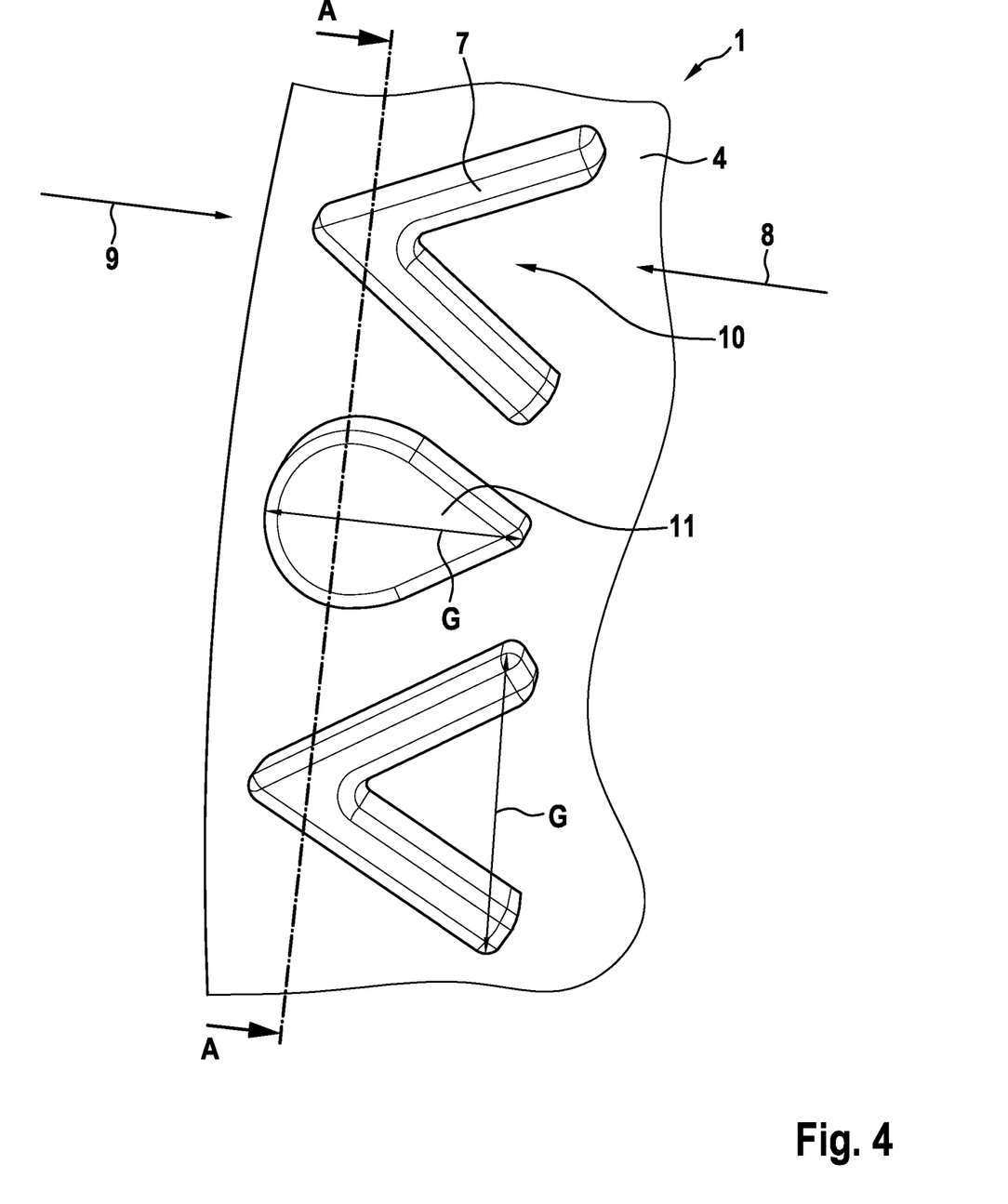
FIG. 4 shows a detail from FIG. 3.

FIG. 4 shows an illustration of a detail from FIG. 3. The exact design embodiment of the first elements 7 and the second elements 11 is to be seen herein.

The first elements 7 at the tip thereof pointing outward are designed so as to be acute. The first elements 7 on the side thereof that points inward have in each case one pocket 10. When flowing in the outflow direction 8, the operating medium flows into these pockets 10. Furthermore, the first elements 7 are configured so as to taper along the outflow direction 8.

The second elements 11 are designed so as to be drop-shaped and are situated so as to neighbor the first elements 7 such that the flow cross section between two first elements 7 is reduced. The tip of the drop shape of the second elements 11 is oriented inward. Accordingly, the convex shape of the drop points outward.

FIG. 4 furthermore shows the variable G of the individual elements 7, 11, the variable G being in each case measured at the largest point of the elements in a plane parallel to the base plate 4. This variable G is substantially smaller than the diameter D. On account thereof, it is possible for a multiplicity of first elements 7 and second elements 11 to be disposed on the base plate 4.

Figure 4A:
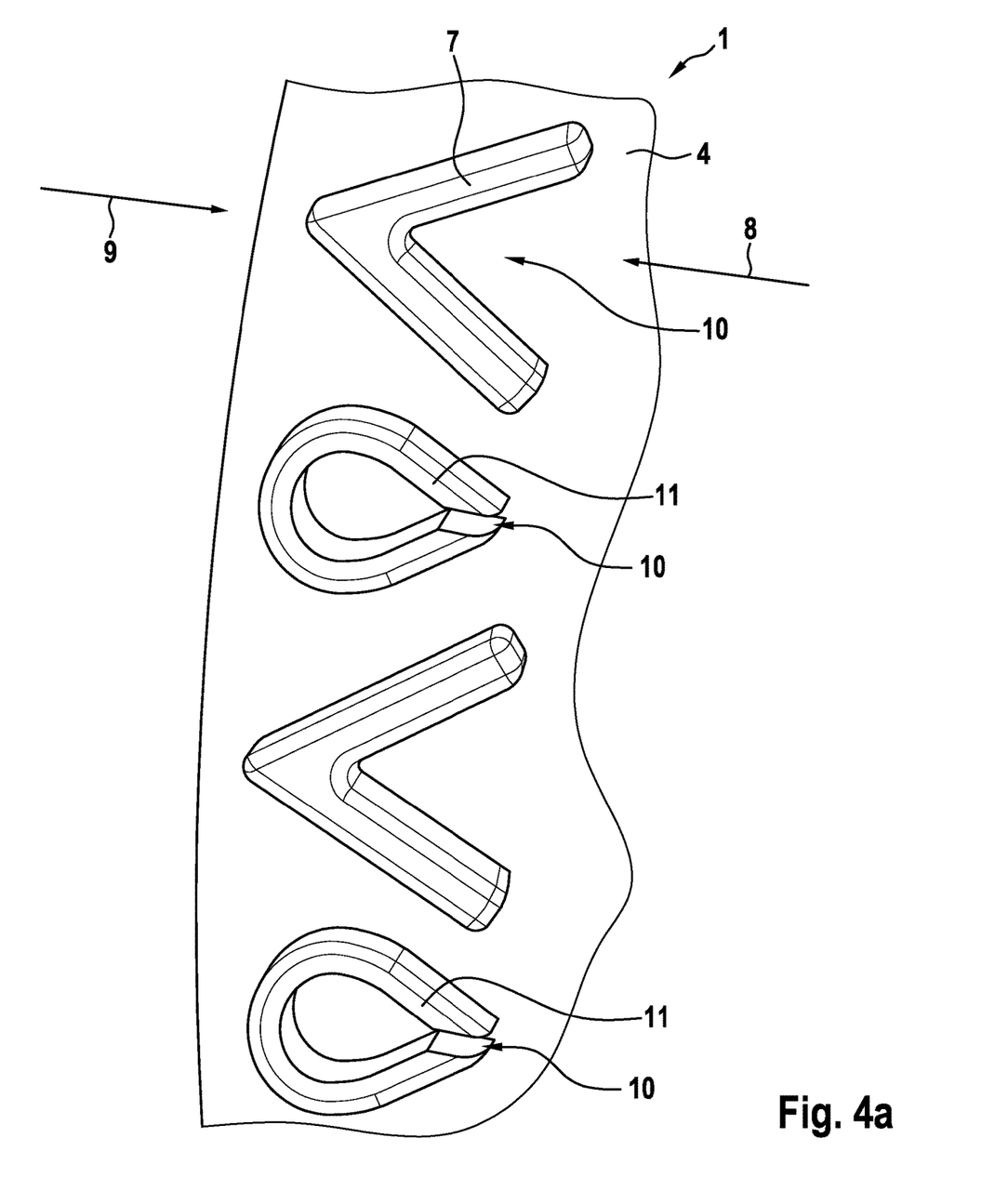
FIG. 4a shows a variant of FIG. 4.

FIG. 4a shows a variant of FIG. 4. According to FIG. 4a, the second elements 11 are likewise drop-shaped. However, the second elements according to this variant on the tip thereof that points inward have an opening and are hollow on the inside. On account thereof, a pocket 10 for receiving the outflowing operating medium is also formed in these second elements 11.

Figure 5:
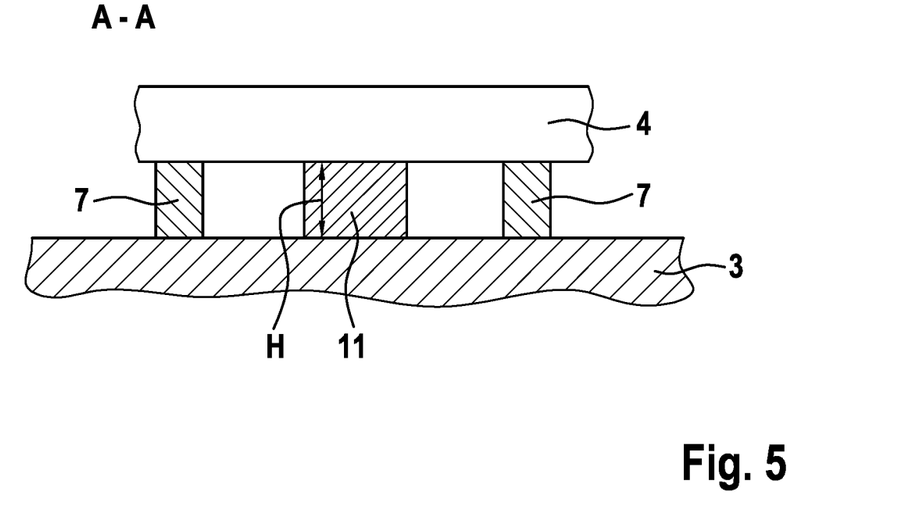
FIG. 5 shows a schematic illustration of the section A-A identified in FIG. 4.

FIG. 5 in a purely schematic manner shows the section A-A plotted in FIG. 4. It can be seen here that the first elements 7 and the second elements 11 are mutually spaced apart such that the operating medium can flow in and out between these elements 7, 11. The first elements 7 and the second elements 11 preferably bear on the base of the operating medium tank 3.

The height H of the first elements 7 and/or of the second elements 11, independently of the embodiment shown here, is preferably at most 0.2*D, in particular at most 0.1*D, particularly preferably at most 0.05*D.

Figure 6:
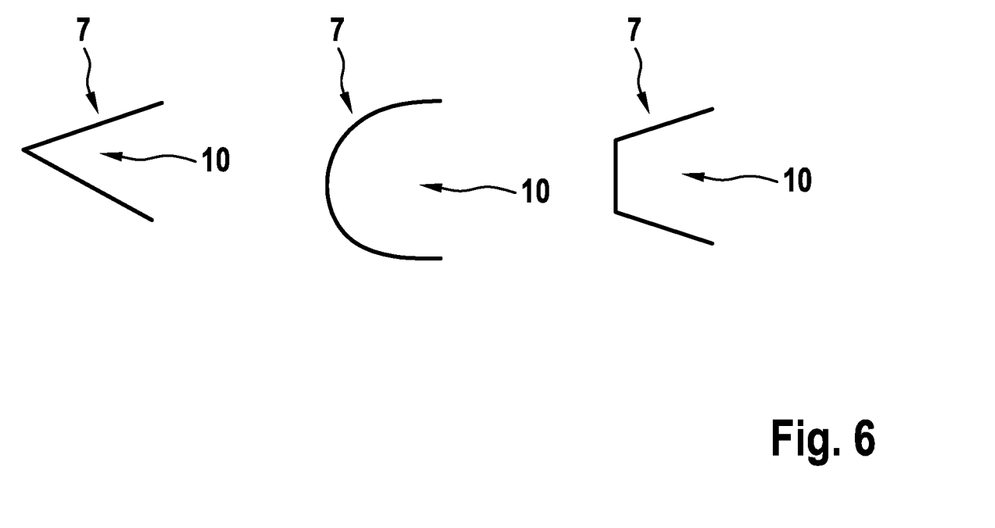
FIG. 6 shows different variants pertaining to the design embodiment of the first elements of the inlet structure disclosed here.

FIG. 6 in a purely schematic manner shows further potential design embodiments of the first elements 7. Accordingly, the respective first element 7 can be acute, as has already been shown in FIGS. 3 and 4. Two legs which are angled in relation to one another herein form the pocket 10.

It is furthermore possible for the first elements 7 to be designed so as to be arcuate. The convex side of the arc herein points outward. The concave side points inward and forms the pocket 10.

It is furthermore possible for the first elements 7 to be designed so as to be trapezoidal, for example. A geometry which tapers along the outflow direction 8 can also be achieved in the case of this trapezium shape. Furthermore, a pocket 10 which is open toward the inside can thus also be formed. These design embodiments according to FIG. 6 are exemplary. Further geometries for the first elements 7 are possible.

Figure 6A:
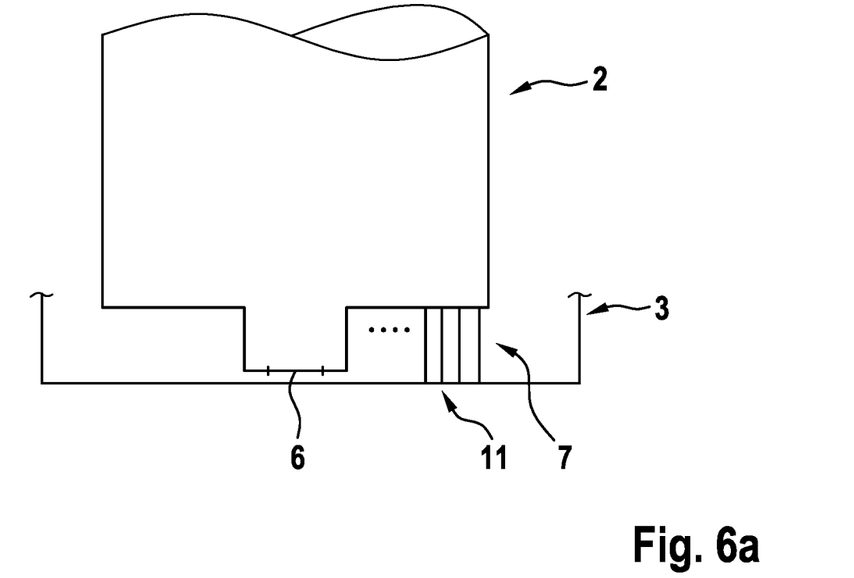
FIGS. 6a/b show variants of FIG. 5 and FIG. 1, respectively.

FIG. 6a highlights that the base of the reservoir pot 2 does not mandatorily have to be flat. According to FIG. 6a, the opening 6 can also be situated in an appendage that extends downward, for example.

Figure 6B:
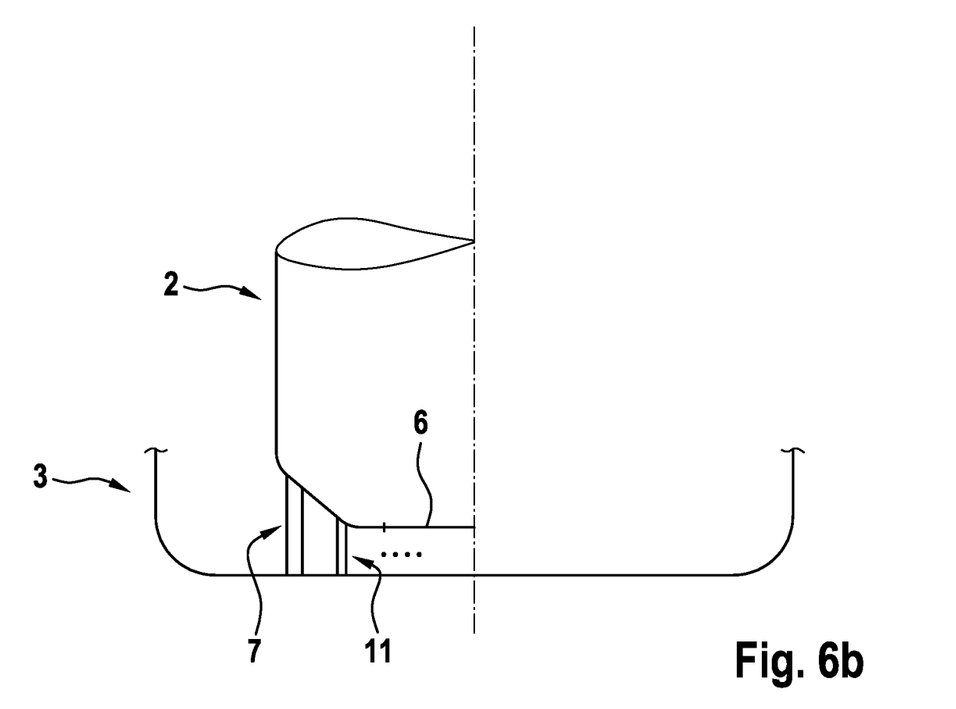

FIG. 6b likewise shows that the base of the reservoir pot 2 does not mandatorily have to be flat. The base can thus rise toward the peripheries of the reservoir pot 2. Accordingly, there are longer and shorter first and second elements 7, 11, respectively, in this instance.

Figure 7:
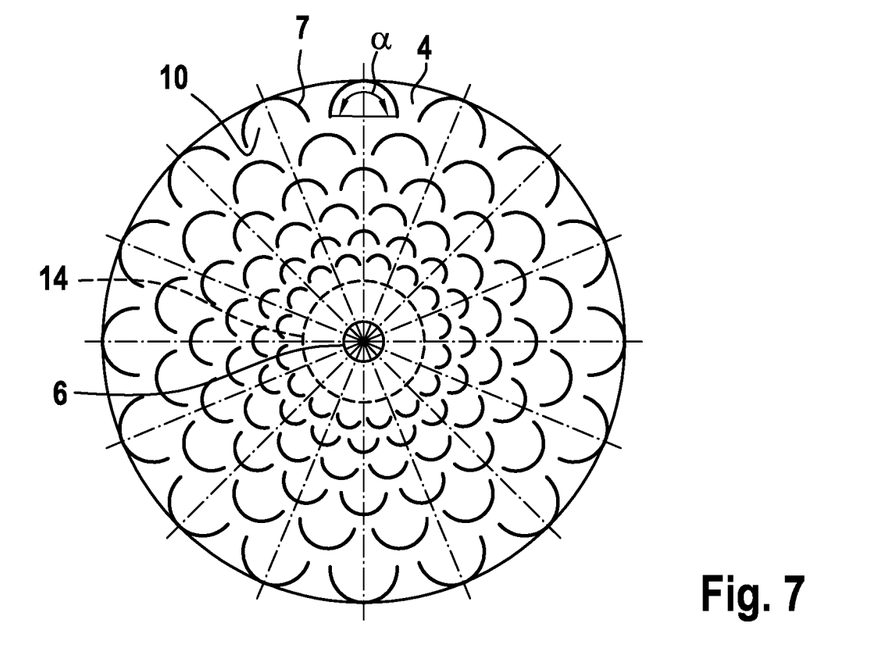
FIGS. 7 to 9 show further variants of the inlet structure disclosed here.
Figure 8:
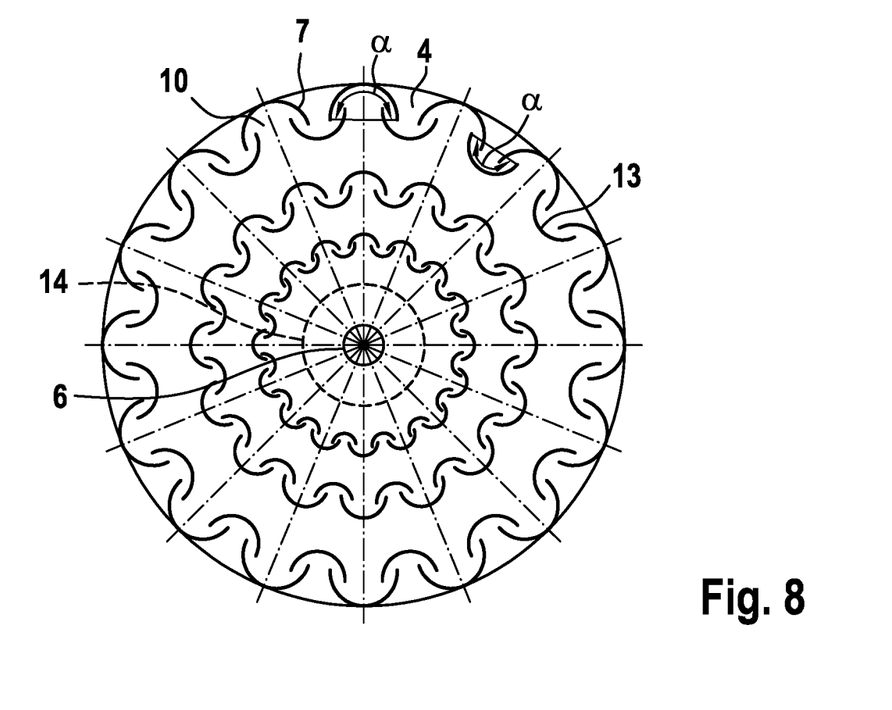
Figure 9:
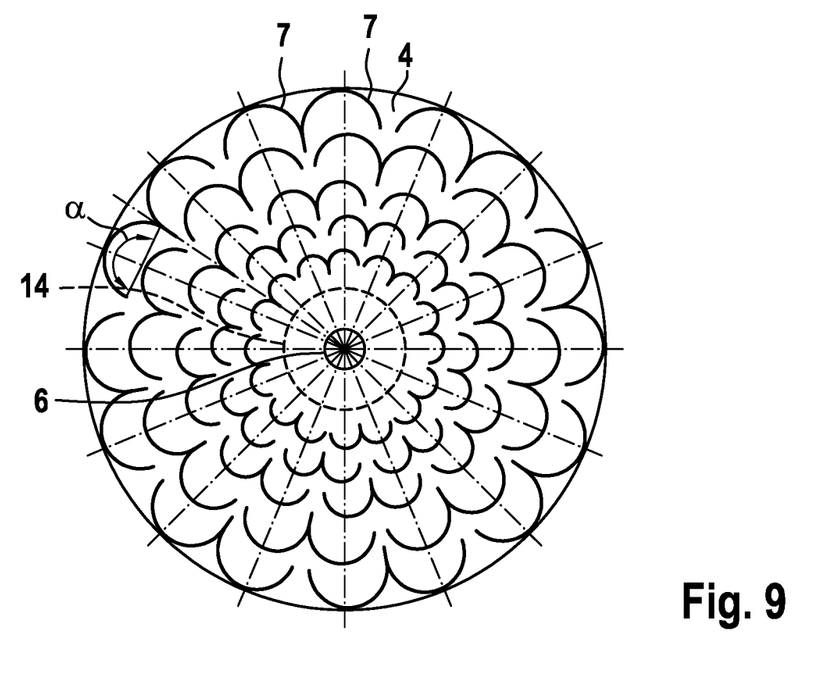

FIGS. 7 to 9 show alternative design embodiments of the inlet structure in which the first elements 7 are situated not only in the distal region 15 but are distributed across a relatively large face of the base plate 4.

FIGS. 7 to 9 furthermore show the potential use of alternative or further, respectively, rock stoppers 14 which are situated so as to be relatively close and about the opening 6. These rock stoppers 14 are likewise elements which extend from the base plate 4. The rock stoppers 14 are not primarily configured for influencing the flow but are intended to prevent relatively large particles entering the opening 6.

FIG. 7 shows a variant having exclusively first, arcuate elements 7 which have in each case one inward-directed pocket 10 and on the side thereof that points outward are configured so as to be convex. The individual first elements 7 here describe in each case approximately a semicircle and thus extend across an angle α of approx. 180 degrees.

Such arcuate first elements can also be used in the distal disposal as per FIG. 3. Independently of the embodiment, the angle α is preferably between 70° and 200°, particularly preferably between 90° and 180°.

FIG. 8 shows a combination of the first elements 7 shown in FIG. 7 and third elements 13. The third elements 13 here are likewise curved elements, wherein the convex side points inward however. The third elements 13 are furthermore disposed such that the third elements 13 direct outflowing operating medium into the pockets 10 of the first elements 7. The first elements 7 as well as the third elements 13 here are designed so as to be approximately semi-circular and extend across the angle α.

FIG. 9 shows a variant in which only first elements 7 are used. Two first elements 7 are in each case in mutual contact. No operating medium can flow between the respective contacting first elements 7. Pairs are thus formed in each case from first elements 7. The individual elements 7 in turn are designed so as to be arcuate at an angle α.

LIST OF REFERENCE SIGNS

1 Inlet structure
2 Reservoir pot
3 Operating medium tank
4 Base plate
5 Receptacle volume
6 Opening
7 First elements
8 Outflow direction
9 Inflow direction
10 Pocket
11 Second elements
12 Third elements
13 Rock stopper
14 Distal region
15 Center

What is claimed is:

1. An inlet structure of a reservoir pot, comprising:
a base plate which is arrangeable in an operating medium tank while forming a receptacle volume below or above the base plate; and
a plurality of first elements which extend from the base plate, wherein
the first elements are at least in part mutually spaced apart, and operating medium is able to flow into the receptacle volume and out from the receptacle volume between the first elements,
the first elements in an outflow direction represent a higher flow resistance than in an inflow direction, and
the first elements on an external side thereof that points counter to the inflow direction are configured so as to be convex, acute, or trapezoidal.

2. The inlet structure according to claim 1, wherein the first elements are configured so as to taper in the outflow direction.

3. The inlet structure according to claim 1, wherein the first elements have, in each case, one pocket which opens counter to the outflow direction.

4. The inlet structure according to claim 1, further comprising:
a plurality of second elements which extend from the base plate, wherein
at least one second element is disposed between two neighboring first elements so as to reduce a flow cross section between the two neighboring first elements.

5. The inlet structure according to claim 4, wherein only one second element is disposed between the two neighboring first elements.

6. The inlet structure according to claim 4, wherein the flow cross section between the first elements and a respective neighboring second element is configured so as to taper in the inflow direction.

7. The inlet structure according to claim 4, wherein the second elements are configured so as to taper in the inflow direction.

8. The inlet structure according to claim 4, wherein the second elements are configured so as to be drop-shaped, and
a tip of the drop shape is oriented in the inflow direction.

9. The inlet structure according to claim 4, wherein the first elements and/or the second elements, when measured parallel to the base plate and at a largest point of the element, have a variable G, and
the variable G is at most 0.2*D, where D is the diameter of the inlet structure.

10. The inlet structure according to claim 4, wherein the first elements and/or the second elements, when measured parallel to the base plate and at a largest point of the element, have a variable G, and
the variable G is at most 0.05*D, where D is the diameter of the inlet structure.

11. The inlet structure according to claim 4, wherein the first elements and/or the second elements are disposed exclusively in a distal region of the inlet structure.

12. The inlet structure according to claim 4, wherein the first elements and/or the second elements are distributed across at least 50% of the face of the inlet structure.

13. The inlet structure according to claim 4, wherein the first elements and/or the second elements are distributed across at least 70% of the face of the inlet structure.

14. The inlet structure according to claim 4, wherein the inlet structure comprises at least 10 first elements and/or wherein the inlet structure comprises at least 10 second elements.

15. The inlet structure according to claim 4, wherein the inlet structure comprises at least 60 first elements and/or wherein the inlet structure comprises at least 60 second elements.

16. A reservoir pot comprising an inlet structure according to claim 1.

17. A vehicle comprising:
an operating medium tank; and
a reservoir pot according to claim 16.

* * * * *